United States Patent [19]

Patel

[11] Patent Number: 6,049,714
[45] Date of Patent: Apr. 11, 2000

[54] IMPLEMENTING NUMBER PORTABILITY USING A FLEXIBLE NUMBERING REGISTER AND AN INTERWORK LINK REGISTER

[75] Inventor: Mahesh Patel, Plano, Tex.

[73] Assignee: Ericsson, Inc., Research Triangle Park, N.C.

[21] Appl. No.: 08/962,479

[22] Filed: Oct. 31, 1997

[51] Int. Cl.[7] .................................................. H04B 7/00
[52] U.S. Cl. ........................................ 455/433; 455/445
[58] Field of Search .................................. 455/422, 414, 455/423, 434, 433, 435, 445, 458; 379/196–200

[56] References Cited

U.S. PATENT DOCUMENTS

| | | | |
|---|---|---|---|
| 5,610,974 | 3/1997 | Lannto | 379/59 |
| 5,771,275 | 6/1998 | Brunner et al. | 455/445 |
| 5,884,179 | 3/1999 | Patel | 455/445 |

FOREIGN PATENT DOCUMENTS 0 738 093 A2  10/1996  European Pat. Off. .

WO 97/36451  10/1997  WIPO .

*Primary Examiner*—Thanh Cong Le
*Attorney, Agent, or Firm*—Jenkens & Gilchrist

[57] ABSTRACT

A telecommunications system and method for routing a phone call when the switch serving the caller cannot access a database is disclosed. The system includes a switch serving mobile stations, a node for receiving information from the switch and for determining whether or not the telephone call terminates at a mobile station, a database for sending information when the telephone call terminates at a mobile station and a second database for sending information when the telephone call does not terminate at a mobile station. The method involves receiving the telephone call at a switch serving mobile stations sending information pertaining to the telephone call to a node, determining whether the telephone call terminates at a mobile station, when the telephone call does terminate at a mobile station, accessing one database, and when the call does not terminate at a mobile station, accessing a second database.

18 Claims, 3 Drawing Sheets

IMPLEMENTING NUMBER PORTABILITY USING A FLEXIBLE NUMBERING REGISTER AND AN INTERWORK LINK REGISTER

BACKGROUND OF THE PRESENT INVENTION

1. Field of the Invention

The present invention relates to telecommunications and, in particular, to routing of calls in a number portability environment.

2. Background and Objects of the Present Invention

Ordinarily, subscriber directory numbers are geographic in that the subscriber directory number relates to a certain geographic area within the domain of the numbering plan. For example, in North America, the first six digits of the subscriber identify the particular switch that serves the directory number. The last four digits identify the actual subscriber within the switch.

The telecommunications network uses the information contained in the called directory number to route the call. This manner of routing calls requires the directory numbers to be tied to the serving switch as opposed to a subscriber. A subscriber who changes switches must change their directory number. If the directory number were not changed, a call to the subscriber would be routed to the wrong switch.

This is problematic for several reasons. Persons who have to change directory numbers because of relocation experience a certain degree of inconvenience brought on by having to notify others of their new directory number. This restriction also presents a major hurdle for mobile systems. Unlike a wire line, a mobile system subscriber does not belong to any one switch. Instead, the mobile subscriber is served by the switch in the area that the subscriber is currently roaming. A call terminating to a mobile subscriber cannot be terminated using the directory number.

To cope with this problem in the wireline telephone, an interface to telephone company databases (Service Control Points) has been developed which cross-references ported directory numbers with the proper routing information. When a call is placed to a portable directory number, the originating switch (the switch serving the calling party) sends a request to an intermediate switch (Signal Transfer Point) for a query to a respective Service Control Point to determine the proper routing information. Likewise, switches serving mobile phones, Mobile Switching Centers (MSC), in a wireless network maintain a similar system whereby calls terminated to mobile phone subscribers can be routed.

However, MSCs are not capable of accessing the Service Control Point (SCP) to determine the routing information of calls terminating to subscribers using the wireline network. One reason for this is that the communications protocol utilized by the SCP is based on an Advanced Intelligent Network (AIN) standard which cannot presently be used by MSCs. Consequently, the MSC routes the call to a portable directory number in the wireline network based on the information contained in the directory number. This, however, results in the call being routed improperly, inefficient use of network resources and longer connection times, because the switch serving the portable directory number cannot necessarily be deduced based on the information contained in the portable directory number.

What is desired, therefore, is a way to enable MSCs to determine the appropriate routing information for portable wireline directory numbers.

Accordingly, it is an object of the present invention to provide an improved system, method and apparatus for routing telephone calls.

It is also an object of the present invention to enable MSCs to determine the appropriate routing information for portable wireline directory numbers in an inexpensive manner.

SUMMARY OF THE INVENTION

The present invention is directed to a system for routing a telephone call in a telecommunication system which includes a switch serving mobile stations, a node for receiving information from the switch and for determining whether or not the telephone call terminates at a mobile station, a database for sending information when the telephone call terminates at a mobile station and a second database for sending information when the telephone call does not terminate at a mobile station. The present invention is also directed to a method for routing a telephone call in a telecommunications system by receiving the telephone call at a switch serving mobile stations, sending information pertaining to the telephone call to a node, determining whether the telephone call terminates at a mobile station, when the telephone call does terminate at a mobile station, accessing one database, and when the call does not terminate at a mobile station, accessing a second database.

BRIEF DESCRIPTION OF THE DRAWINGS

The disclosed inventions will be described with reference to the accompanying drawings, which show important sample embodiments of the invention and which are incorporated in the specifications hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
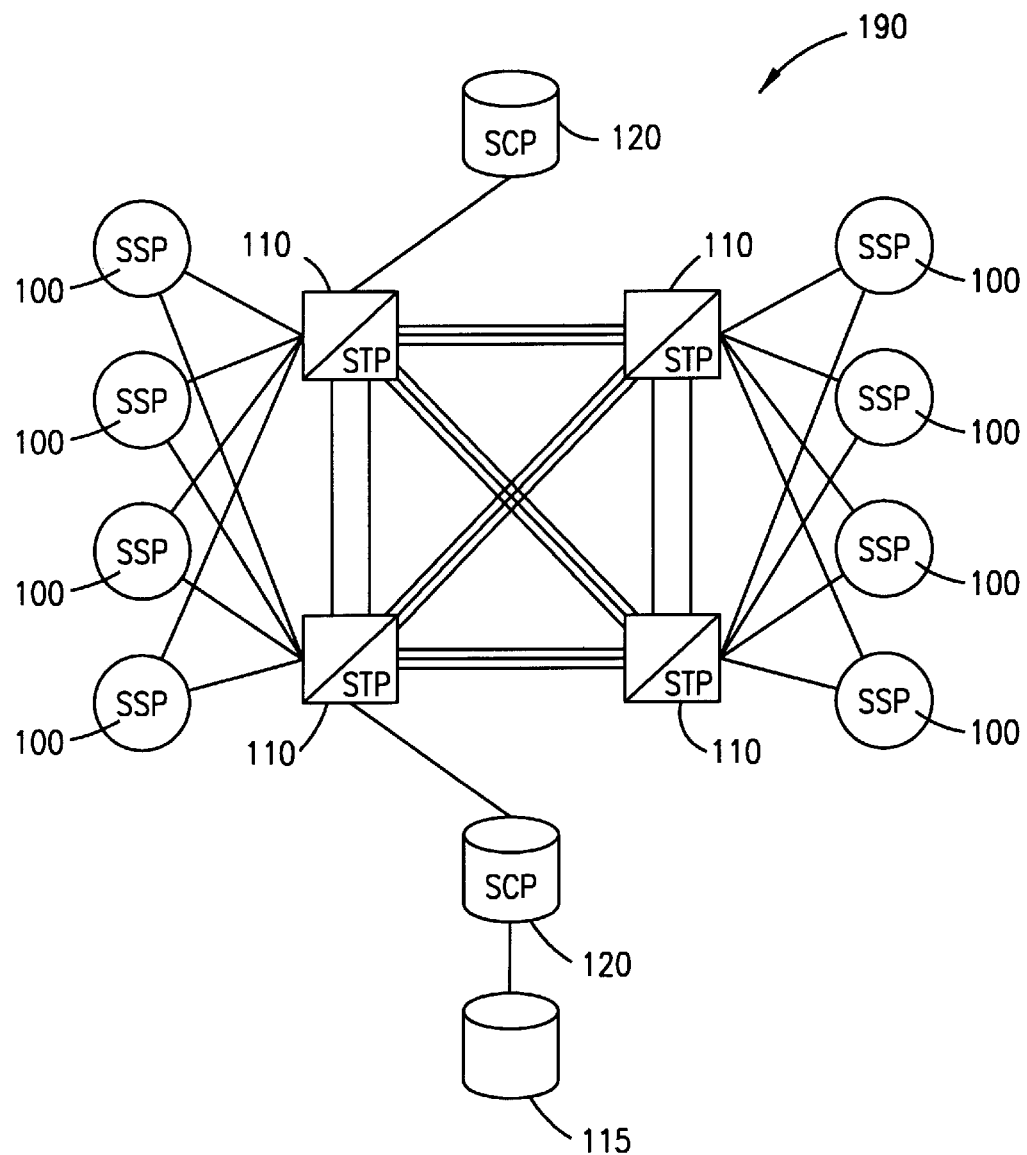
FIG. 1 is a block diagram of Service Switching Points (SSPs), Signal Transfer Points (STPs), and Service Control Points (SCPs) in a conventional telephone network.

Referring now to FIG. 1 of the drawings, there is shown a configuration of Service Switching Points (SSPs) 100 serving as the local exchanges in a telephone network 190. The SSPs 100 also provide an Integrated Services Digital Network User Part(ISUP) protocol for the Signal Transfer Points (STPs) 110, as is understood in the art.

The STP 110 serves as an information router, and switches messages received from a particular SSP 100 through the network 190 to their appropriate destinations (another SSP 100). As is also understood in the art, the STP 110 receives messages in a packet formatted according to the standards of the Intelligent Network (IN) from the SSPs 100. These packets are either related to call connections or database queries. If the packet is a request to connect a call, the message is forwarded to a particular destination end office (another SSP 100), where the call is terminated.

If, however, the message is a database query seeking additional information, the destination is a database. Database access is provided through a Service Control Point (SCP) 120, also shown in FIG. 1, which does not store the information, but acts as an interface to a computer (not shown) that houses the requested information.

Presently, a subscriber on one SSP 100 has the ability to move to a different SSP 100 while retaining their public directory number. This is referred to as number portability. One key advantage of number portability is that other subscribers can connect to the portable subscriber without any changes to their dialing procedures.

If a subscriber has been ported-out to another SSP 100, the Initial Address Message (IAM) sent by the originating SSP 100 must be modified to account for the change in the terminating SSP. A Local Number Portability (LNP) database holds the Location Routing Number (LRN), which is a ten-digit number used to uniquely identify the switch that has the ported-out directory number. Specifically, the LRN is the number for the recipient switch, which is the switch that has ported-in a directory number from another switch (called a donor switch). This ported-in directory number was not previously served by the recipient switch.

Typically, the SSP 100 sends an LNP query to the SCP 120, which accesses the LNP database in order to retrieve the routing information for a ported subscriber. The query response by the SCP 120 provides that SSP 100 with both the pertinent LRN, which is populated (that is placed) in the Called Party Number (CPN) parameter in the IAM, and the Ported Dialed Number (PDN), e.g., the actual dialed digits for the ported-out subscriber, which is placed in the Generic Address Parameter (GAP) in the IAM. However, if a given SSP 100 is not capable of communicating according to the AIN standards, an LNP query to the SCP 120 will not be possible.

Figure 2:
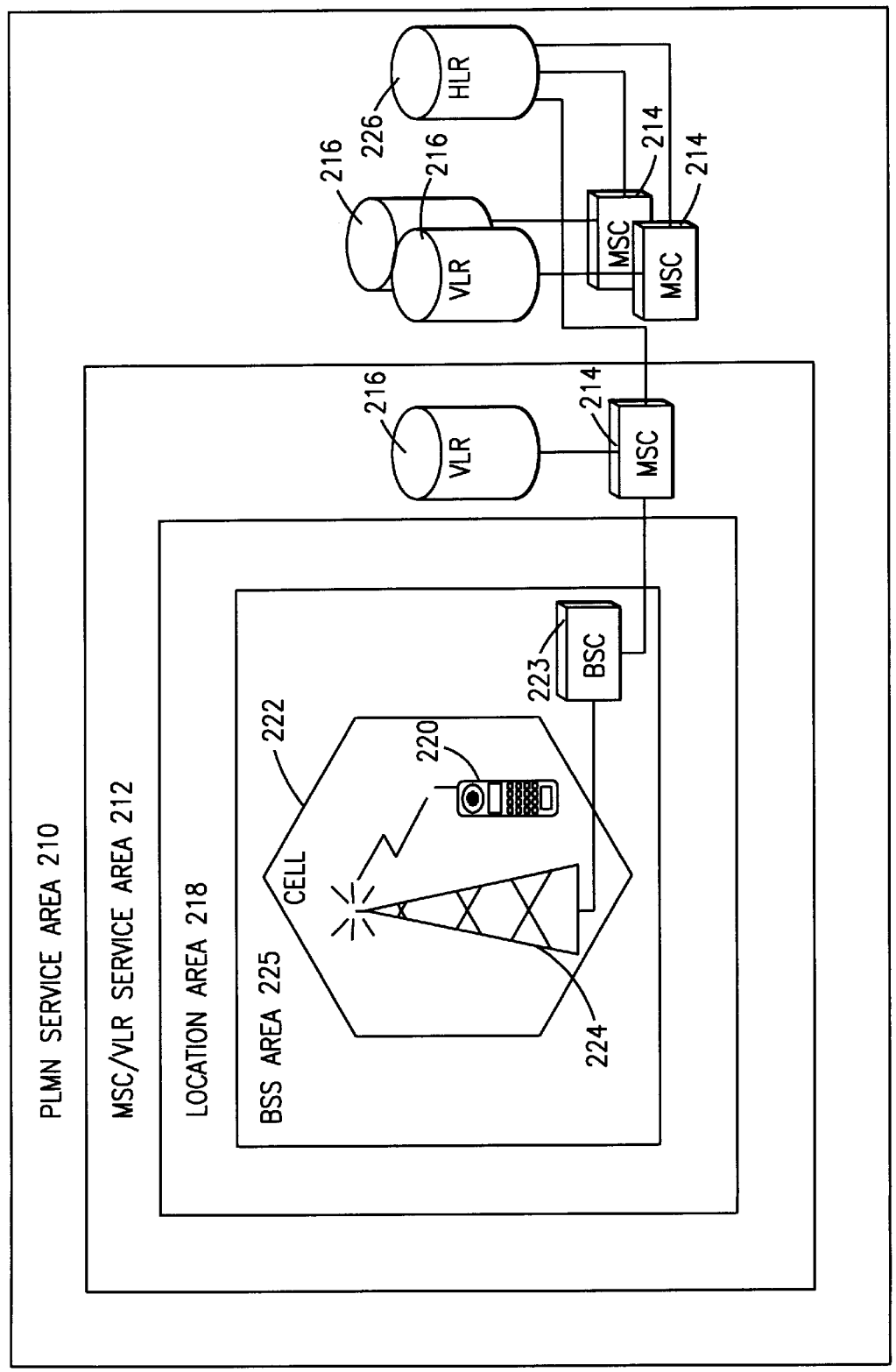
FIG. 2 is a block diagram of a conventional terrestrially-based wireless telecommunications system.

Mobile Services Switching Centers serving cellular phone subscribers are commonly incapable of communicating according to the IN standards. Referring now to FIG. 2, an MSC which is incapable of communicating according to the IN standards is illustrated.

The MSC is part of a Public Land Mobile Network (PLMN), such as a GSM cellular network 210, which in turn is composed of a plurality of areas 212, each with a Mobile Services Center (MSC) 214 and an integrated Visitor Location Register (VLR) 216 therein. The MSC/VLR areas 212, in turn, include a plurality of Location Areas (LA) 218, which are defined as that part of a given MSC/VLR area 212 in which a mobile station (MS) (terminal) 220 may move freely without having to send update location information to the MSC 214 for the MSC/VLR area 212 that controls the LA 218. Each Location Area 212 is divided into a number of cells 222. Mobile Station (MS) 220 is the physical equipment, e.g., a car phone or other portable phone, used by mobile subscribers to communicate with the cellular network 210, each other, and users outside the subscribed network, both wireline and wireless.

The MSC 214 is in communication with at least one Base Station Controller (BSC) 223, which, in turn, is in contact with at least one Base Transceiver Station (BTS) 224. The BTS is the physical equipment, illustrated for simplicity as a radio tower, that provides radio coverage to the geographical part of the cell 222 for which it is responsible. It should be understood that the BSC 223 may be connected to several base transceiver stations 224, and may be implemented as a stand-alone node or integrated with the MSC 214. In either event, the BSC 223 and BTS 224 components, as a whole, are generally referred to as a Base Station System (BSS) 225.

With further reference to FIG. 2, the PLMN Service Area or cellular network 210 includes a Home Location Register (HLR) 226, which is a database maintaining all subscriber information, e.g., user profiles, current location information, International Mobile Subscriber Identity (IMSI) numbers, and other administrative information. The HLR 226 may be co-located with a given MSC 214, integrated with the MSC 214, or alternatively can service multiple MSCs 214, the latter of which is illustrated in FIG. 2.

The VLR 216 is a database containing information about all of the Mobile Stations 220 currently located within the MSC/VLR area 212. If a MS 220 roams into a new MSC/VLR area 212, the VLR 216 connected to that MSC 214 requests data about that Mobile Station 220 from the HLR database 226 (simultaneously informing the HLR 226 about the current location of the MS 220). Accordingly, if the user of the MS 220 then wants to make a call, the local VLR 216 has the requisite identification information without having to reinterrogate the HLR 226. In the aforesaid manner, the VLR and HLR databases 216 and 226, respectively, contain various subscriber information associated with a given MS 220.

As stated above, the MSC 214 is not capable of communicating using the IN standard, and therefore, is unable to launch an LNP query to the SCP 120.

In one embodiment of the present invention the MSC 214 treats all incoming calls as though terminating at another MS 220 and launches a query to the HLR 226. The query is intercepted and examined. Calls which terminate at a MS 220 are routed to the HLR 226. Calls terminating at a portable number are routed to a centralized module which interfaces with the SCP 120 to perform an LNP query.

Figure 3:
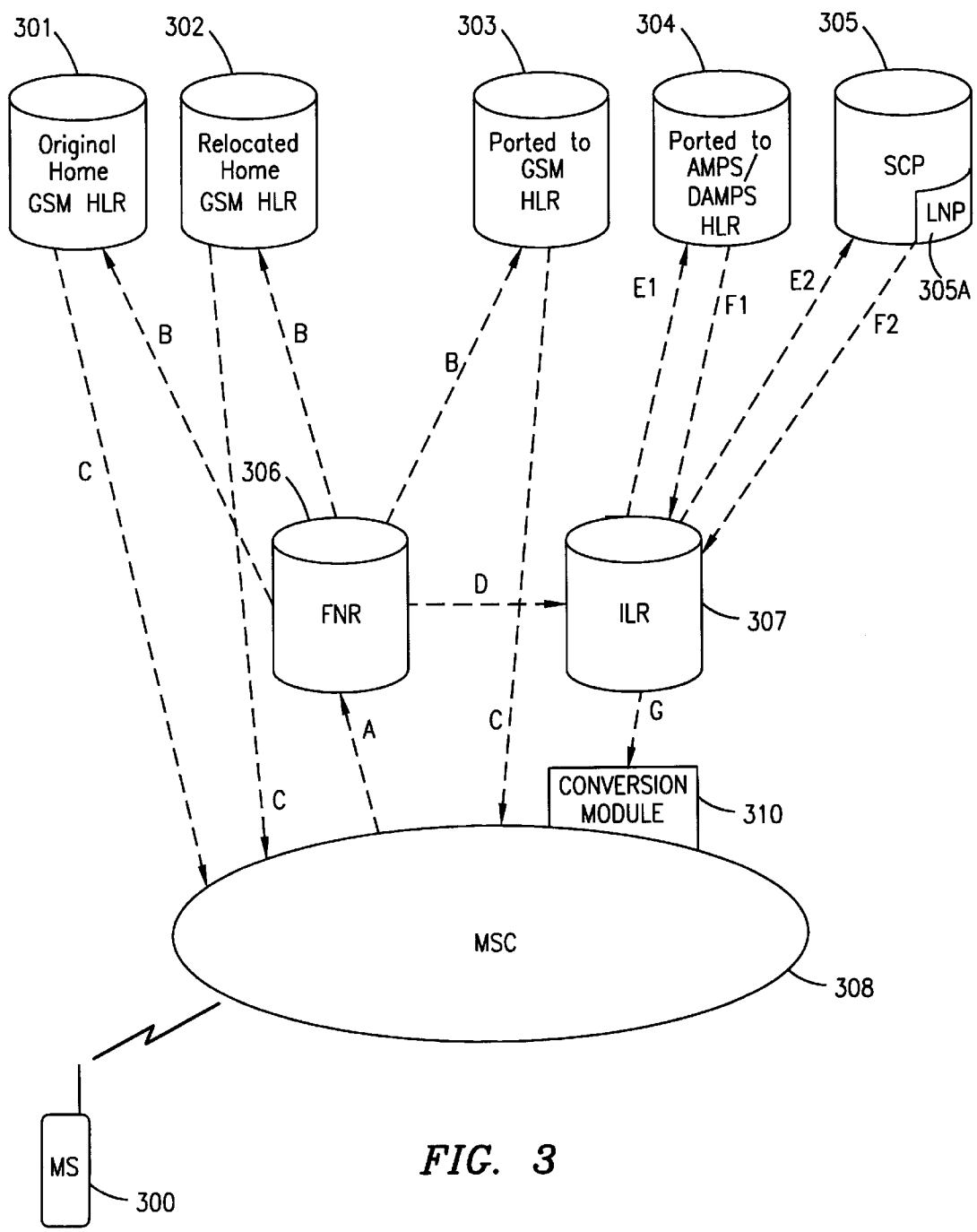
FIG. 3 is a block diagram illustrating an implementation of the present invention within in the system shown in FIGS. 1 and 2.

Referring now to FIG. 3, a presently preferred embodiment of the invention is illustrated by a network model for a mobile system, such as shown in FIG. 2. The network model includes an Original Home GSM HLR 301, a Relocated Home GSM HLR 302, and a Ported-to-GSM HLR 303, each of which are connected to receive data from a Flexible Number Register (FNR) 306. The network also includes an SCP 305 (such as the SCP 120 of FIG. 1) which further includes an LNP 305A therein, and a Ported-to-AMPS/DAMPS HLR 304, each of which are bi-directionally connected to an Interwork Link Register (ILR) 307. The ILR 307 is connected to receive data from a Flexible Number Register (FNR) 306.

The network model in FIG. 3 also includes at least one MSC 308 (such as the MSC 214 shown in FIG. 2) where calls from an MS 300 (such as MS 220 in FIG. 2) originate. Each MSC 308 is connected to receive data from the Original Home GSM HLR 301, the Relocated Home GSM HLR 302, and the Ported-to-GSM HLR 303, and send data to the FNR 306. Because the MSCs 308 are not capable of communicating with the SCP 305, each MSC is connected to receive data from a centralized ILR 307, which receives data from the SCP 305 and the Ported-to-AMPS/DAMPS HLR 304, and sends it to the MSC 308.

In a preferred embodiment, the ILR 307 possesses a layered architecture which allows the support of multiple types of signaling including, but not limited to, the various types of IN signaling such as Intelligent Network 1 (IN/1), Advanced Intelligent Network (AIN), and Intelligent Network Application Part (INAP).

With further reference to FIG. 3, when the MSC 308 receives a phone call from a mobile station (MS) 300, the MSC 308 forwards the call as illustrated in FIG. 3 by reference identifier A as though the call terminates at another MS.

The FNR 306 intercepts the call and determines whether the call terminates at another mobile subscriber or at a portable directory number.

If the FNR 306 determines that the call terminates at another MS, the FNR 306 directs a query to the appropriate HLR (Original Home GSM HLR 301, Relocated Home GSM HLR 302, or Ported GSM HLR 303) illustrated in FIG. 3 by the reference identifier B. An LRN is determined by the appropriated HLR (Original Home GSM HLR 301, Relocated Home GSM HLR 302, or Ported GSM HLR 303) and forwarded to the MSC 308, as illustrated in FIG. 3 by the reference identifier C.

If, however, the FNR 306 determines that the incoming call terminates at a portable directory number, then destination data and other information pertaining to the call is routed to the ILR 307 as illustrated by reference identifier D. Upon receiving the information, the ILR 307 launches a query to the appropriate network, either the Ported-to-AMPS/DAMPS HLR 304, or the SCP 305 and the LNP 305A therein, illustrated by reference identifiers E1 and E2 respectively.

The query determines whether the called directory number has been ported. If the called directory number has been ported, the ILR 307 receives a Location Routing Number (LRN) from the Ported-to-AMPS/DAMPS HLR 304 or the SCP 305 (with the LNP 305A therein) as illustrated in FIG. 3 by reference identifiers F1 and F2, respectively. The LRN contains information for routing the call to the appropriate terminating switch (such as an SSP 100 of FIG. 1).

The ILR 307 returns the results of the query to the originating MSC 308 illustrated by reference identifier G, utilizing a communication protocol such as what is known in the art as Signaling System 7 (SS7) or Mobile Application Protocol. Those skilled in the art will recognize that the communication protocol is not limited to merely SS7 or Mobile Application Protocol. This information is then used by the MSC 308 to route the call to the terminating switch (such as an SSP 100 of FIG. 1).

The MSC 308 might not be equipped to utilize an LRN. In one embodiment of the application, the MSC 308 is attached to a Conversion Module 310 which translates the LRN into a form understandable by the MSC 308, such as, but not limited to, what is known as a Mobile Subscriber Roaming Number (MSRN).

The MSC 308 preferably communicates with other switches (such as an SSP 100 of FIG. 1) using the Integrated Services Digital Network User Port (ISUP) protocol. In particular, the information provided by the ILR 307 is used by the MSC 308 to build the ISUP protocol for routing the telephone call.

As will be recognized by those skilled in the art, the innovative concepts described in the present application can be modified and varied over a wide range of applications. For example, the FNR 306 and the ILR 307 can be consolidated into a single unit. Accordingly, the scope of the patent subject matter should not be limited to any of the specific exemplary teachings discussed, but is only limited by the following claims.

What is claimed is:

1. A routing system for routing a communication in a telecommunications network, said routing system comprising:
   a switch, said switch being associated with a plurality of mobile stations in said telecommunications network, said switch receiving said communication;
   a node, connected to said switch, said switch forwarding and said node receiving a destination inquiry corresponding to said communication;
   determining means, within said node, for determining whether said communication terminates at a destination mobile station; and
   routing means, within said node, for routing said destination inquiry to a first database if said determining means determines that said communication terminates at said destination mobile station, and to a second database otherwise, said second database forwarding a routing address to said switch for routing said communication.

2. The routing system of claim 1, further comprising:
   a second node, between said node and said second database, said destination inquiry being routed to said second database through said second node.

3. The routing system of claim 2, wherein said second database is a Local Number Portability database.

4. The routing system of claim 3, wherein said Local Number Portability is attached to a Service Control Point.

5. The routing system of claim 3, wherein said Local Number Portability database, in response to said destination inquiry, forwards a Location Routing Number to said switch, said Location Routing Number corresponding to another switch in said telecommunication network.

6. The routing system of claim 2, wherein said second database forwards, in response to said destination inquiry, said routing address to said switch through said second node.

7. The routing system of claim 6, wherein said second database formats said routing address in accordance with an Intelligent Network protocol.

8. The routing system of claim 6, wherein said second node formats said routing address in accordance with the Signaling System 7 Signaling Protocol.

9. The routing system of claim 6, wherein said second node formats said routing address in accordance with the Mobile Application Protocol.

10. A method for routing a telephone call in a telecommunications system, said method comprising the steps of:
    receiving said telephone call at a switch, said switch being associated with a plurality of mobile stations in said telecommunications system;
    forwarding a destination inquiry corresponding to said telephone call by said switch to a node;
    determining at said node whether said telephone call terminates at a destination mobile station;
    routing by said node the destination inquiry to a first database if said telephone call terminates at said destination mobile station, and to a second database otherwise; and
    forwarding by said second database a routing address to said switch for routing said telephone call.

11. The method of claim 10, wherein said step of routing to said second database further comprises the steps of:
    routing said destination inquiry to a second node; and
    routing, by said second node, said destination inquiry to said second database.

12. The method of claim 11 wherein said second database is a Local Number Portability database.

13. The method of claim 12, wherein said Local Number Portability database is attached to a Service Control Point.

14. The method of claim 12 wherein said routing address comprises a Location Routing Number, said Location Routing Number corresponding to another switch in said telecommunications network.

15. The method of claim 11 wherein said step of forwarding by said second database further comprises the steps of:

routing, in response to said destination inquiry, said routing address from said second database to said second node; and routing from said second node, said routing address to said switch.

16. The method of claim 15 wherein said step of routing said routing address from said second database to said second node further comprises the step of:

formatting said routing address in accordance with an Intelligent Network Protocol.

17. The method of claim 15 wherein said step of routing said routing address from said second node to said switch further comprises the step of:

formatting said routing address in accordance with the standards of Signaling System 7 signaling.

18. The method of claim 15 wherein said step of routing said routing address from said second node to said switch further comprises the step of:

formatting said routing address in accordance with the standards of the Mobile Application Protocol.

* * * * *